United States Patent
Lee

(10) Patent No.: US 9,731,695 B2
(45) Date of Patent: Aug. 15, 2017

(54) SYSTEM AND METHOD FOR CONTROLLING VACUUM PUMP IN GASOLINE VEHICLE WITH CLUTCH

(71) Applicant: HYUNDAI MOTOR COMPANY, Seoul (KR)

(72) Inventor: Sang Min Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 14/663,254

(22) Filed: Mar. 19, 2015

(65) Prior Publication Data
US 2016/0121871 A1    May 5, 2016

(30) Foreign Application Priority Data
Oct. 31, 2014  (KR) .................. 10-2014-0150155

(51) Int. Cl.
| | | |
|---|---|---|
| *B60W 10/02* | (2006.01) | |
| *B60T 13/48* | (2006.01) | |
| *B60T 13/46* | (2006.01) | |
| *B60T 17/02* | (2006.01) | |

(52) U.S. Cl.
CPC .............. *B60T 17/02* (2013.01); *B60T 13/46* (2013.01)

(58) Field of Classification Search
CPC .......... B60T 13/46; B60T 13/48; B60T 13/52; B60T 17/02; B60W 10/02
See application file for complete search history.

(56) References Cited

U.S. PATENT DOCUMENTS

2014/0171264 A1*  6/2014  Sundaresan ............. B60T 17/02
477/166

FOREIGN PATENT DOCUMENTS

| JP | 2010-007616 A | 1/2010 |
|---|---|---|
| JP | 2012201154 A | 10/2012 |
| KR | 10-2006-0069101 A | 6/2006 |
| KR | 10-2011-0072864 A | 6/2011 |
| KR | 10-2014-0060142 A | 5/2014 |

* cited by examiner

*Primary Examiner* — Huan Le
(74) *Attorney, Agent, or Firm* — McDermott Will & Emery LLP

(57) ABSTRACT

A system for controlling a vacuum pump in a gasoline vehicle with a clutch includes a clutch installed between a driving source supplying power of an engine and a vacuum pump to selectively interrupt the power supplied from the driving source to the vacuum pump. A pressure sensor is configured to sense a pressure of a vacuum line installed between the vacuum pump and a brake booster. A controller is configured to compare the pressure measured by the pressure sensor with a target pressure value to selectively interrupt the clutch.

11 Claims, 3 Drawing Sheets

SYSTEM AND METHOD FOR CONTROLLING VACUUM PUMP IN GASOLINE VEHICLE WITH CLUTCH

CROSS REFERENCE TO RELATED APPLICATION

The present application claims the benefit of priority to Korean Patent Application Number 10-2014-0150155 filed on Oct. 31, 2014, the entire contents of which application are incorporated herein for all purposes by this reference.

TECHNICAL FIELD

The present disclosure relates to a system and a method for controlling a vacuum pump in a gasoline vehicle with a clutch, and more particularly, to a system and a method for controlling a vacuum pump in a gasoline vehicle with a clutch capable of controlling a catalyst temperature and improving a braking force of a brake.

BACKGROUND

A gasoline engine vehicle is available with a turbo system having a turbo charge which increases fuel efficiency and an engine output.

The turbo system increases the output by increasing an air content sucked into an engine using energy of exhaust gas which is discharged outside the vehicle, but the turbo system installed at an exhaust line side has difficulty in increasing a catalyst temperature at an early stage of starting the vehicle.

Automobile industries have conducted multidirectional researches to satisfy discharge regulations. As a method for this purpose, there is a method for installing a catalyst apparatus for purifying exhaust gas at a predetermined position of an exhaust manifold.

In this case, since a catalyst material inside the catalyst apparatus is generally activated at 350° C. or more to provide a normal purification function, after the vehicle starts, the catalyst apparatus does not purify discharged harmful materials until the catalyst apparatus reaches an activation temperature of 350° C. and discharges non-purified harmful materials in the air.

Therefore, after the vehicle starts, the vehicle uses a separate heater or controls fuel injection to heat the catalyst apparatus so that the catalyst apparatus may rapidly reach the activation temperature of 350° C.

As a method for increasing a catalyst temperature at an early stage of the vehicle start, there is a method for delaying ignition timing.

That is, when the ignition timing is delayed even though the same fuel amount is combusted, the method utilizes characteristics to reduce a combustion pressure and increase a temperature of exhaust gas.

However, even though the ignition timing is artificially lagged, in order for the vehicle to obtain a required output, a larger content of air needs to be delivered to a combustion chamber. To this end, an open value of a throttle connected to an engine combustion chamber needs to be large.

In this case, in the case of the gasoline engine in which the turbo charger is equipped, as the open value of the throttle is increased under an operation condition to activate the catalyst apparatus, the phenomenon that a pressure of an intake manifold (pressure of an intake line) is not reduced but is increased to a level of an atmospheric pressure occurs.

Therefore, after the vehicle starts, at the time of lagging the ignition timing under the operation condition to activate the catalyst apparatus, the catalyst temperature is increased but pressure of the intake line is not reduced. As a result, a brake using the catalyst apparatus has a problem of a braking force.

The related art uses a brake booster and a mechanical vacuum pump to keep a pressure of vacuum inside the brake booster in a vacuum state to increase the braking force of the brake.

When a vehicle runs normally, an intake pressure is lower than the atmospheric pressure, such that the related art may not able to maintain the braking force. However, in the case in which the ignition timing is delayed to increase the catalyst temperature at an early stage of the vehicle start, when the open value of the throttle is increased for the vehicle to obtain the required output, as described above, the pressure of the intake line is increased to the atmospheric pressure, and thus, the pressure of vacuum inside the brake booster is not kept in the vacuum state, such that the related art has a problem in keeping the braking force of the brake.

The contents described as the related art have been provided only for assisting in the understanding for the background of the present disclosure and should not be considered as corresponding to the related art known to those skilled in the art.

SUMMARY

An aspect of the present inventive concept provides a system and a method for controlling a vacuum pump in a gasoline vehicle with a clutch capable of keeping a pressure inside a brake booster in a vacuum state even in a driving mode for increasing a catalyst temperature at an early stage of starting an engine in the vehicle in which a turbo system is equipped.

According to an exemplary embodiment of the present inventive concept, a system for controlling a vacuum pump in a gasoline vehicle with a clutch includes a clutch installed between a driving source supplying power of an engine and a vacuum pump to selectively interrupt the power supplied from the driving source to the vacuum pump. A pressure sensor is configured to sense a pressure of a vacuum line installed between the vacuum pump and a brake booster. A controller is configured to compare the pressure measured by the pressure sensor with a target pressure value to selectively interrupt the clutch.

The controller may transmit a connection signal to the clutch to maintain the pressure inside the brake booster in a vacuum state at an early stage of starting the vehicle to transmit the power from the driving source to a vacuum pump rotating shaft installed at the vacuum pump.

The controller may transmit a connection signal to the clutch when the pressure of the vacuum line is higher than the target pressure value and transmit an interruption signal to the clutch when the pressure of the vacuum line is lower than the target pressure value.

The clutch may be installed between a cam shaft installed at the engine and a vacuum pump rotating shaft installed at the vacuum pump.

The clutch may be installed between a cam shaft installed at the engine and a vacuum pump rotating shaft installed at the vacuum pump.

According to another exemplary embodiment of the present inventive concept, a method for controlling a vacuum pump in a gasoline vehicle with a clutch includes determining whether a mode is a catalyst temperature increasing mode for increasing a catalyst temperature in consideration of a driving state of the vehicle by the controller. A power is supplied to the vacuum pump in the catalyst temperature increasing mode by a driving source. A vacuum pressure supplied to a vacuum pump is measured by a pressure sensor. The power is supplied to the vacuum pump by the driving source when the vacuum pressure supplied to the vacuum pump is higher than a target pressure value.

In the step of supplying the power, a connection signal may be applied to a power connector installed between the driving source and the vacuum pump.

The power connector may be a clutch selectively interrupting the power supplied from the engine to the vacuum pump.

In the step of measuring the pressure, when the vacuum pressure supplied to the vacuum pump is higher than the target pressure value, the connection signal may be transmitted to the clutch, and when the pressure of the vacuum line is lower than the target pressure value, an interruption signal may be transmitted to the clutch.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, a system and a method for controlling a vacuum pump in a gasoline vehicle with a clutch according to exemplary embodiments of the present inventive concept will be described with reference to the accompanying drawings.

Figure 1:
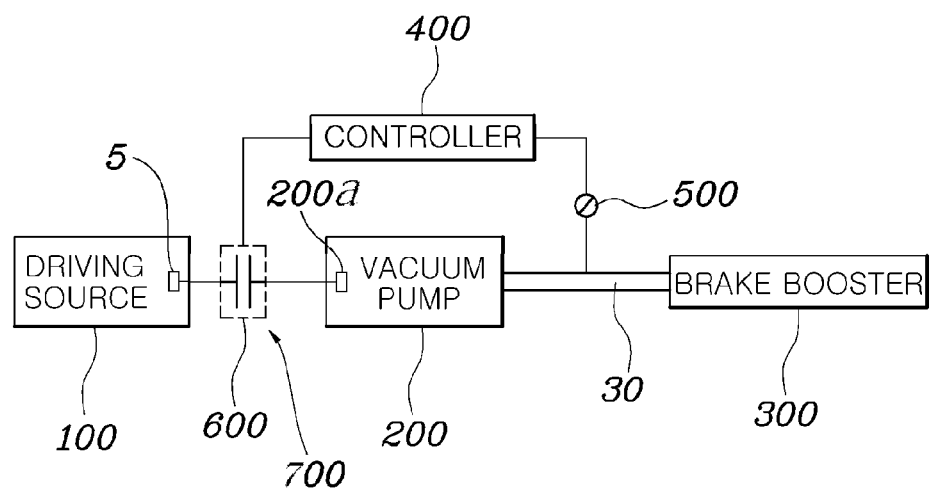
FIG. 1 is a conceptual diagram of a system for controlling a vacuum pump in a gasoline vehicle with a clutch according to an exemplary embodiment of the present inventive concept.

FIG. 1 is a conceptual diagram of a system for controlling a vacuum pump in a gasoline vehicle with a clutch according to an exemplary embodiment of the present inventive concept.

As illustrated in FIG. 1, the system for controlling a vacuum pump in a gasoline vehicle with a clutch according to the exemplary embodiment of the present inventive concept largely includes a clutch 600, a pressure sensor 500, and a controller 400.

The clutch 600 is installed between a driving source 100 supplying power of an engine and a vacuum pump 200 make an inside of a brake booster 300 in a vacuum state to allow the controller 400 to be described below to selectively interrupt the power supplied from the driving source 100.

In general, the vacuum pump 200 generates vacuum by rotating a rotor and a vane equipped therein and discharges the vacuum pressure to a vacuum line 30 side installed outside the vacuum pump 200, in which the vacuum pressure is introduced into the brake booster 300 to supply a vacuum pressure required to brake the vehicle.

According to the related art, a vacuum pump rotating shaft 200a installed at the vacuum pump 200 is coupled with a cam shaft 5 installed at the engine, and thus, the vacuum pump rotating shaft 200a rotates by a driving force of the engine to generate the vacuum pressure and then transmits the vacuum pressure into the brake booster 300, but according to the exemplary embodiment of the present inventive concept, the clutch 600 which may interrupt the power is installed between the driving source 100 and the vacuum pump 200 to enable the controller 400 to deliver the power of the engine to the vacuum pump 200 if necessary.

The pressure sensor 500 which may measure a pressure of the vacuum line 30 installed between the vacuum pump 200 and the brake booster 300 is installed at one point of the vacuum line 30 and measures a pressure in real time when the vacuum pressure flows from the vacuum pump 200 into the brake booster 300 and transmits the sensed pressure value to the controller 400.

The controller 400 installed between the clutch 600 and the pressure sensor 500 may be an electronic control unit (ECU), in which the ECU compares a pre-stored target pressure value with a pressure value measured by the pressure sensor 500 and then selectively controls a turn on/off of the clutch 600 according to the comparison result.

As an example, when the vacuum pressure inside the brake booster 300 requires −400 mmHg, in a case in which the pressure of the vacuum line 30 which is measured by the pressure sensor 500 is higher than −400 mmHg, the controller 400 delivers the power supplied from the driving source 100 to the vacuum pump 200, and thus delivers the vacuum pressure supplied by the vacuum pump 200 into the brake booster 300.

Further, the controller 400 controls the clutch 600 by transmitting an interruption (OFF) signal to the clutch 600 when the pressure value of the vacuum line 30 which is measured by the pressure sensor 500 is lower than the set target pressure value.

Figure 2:
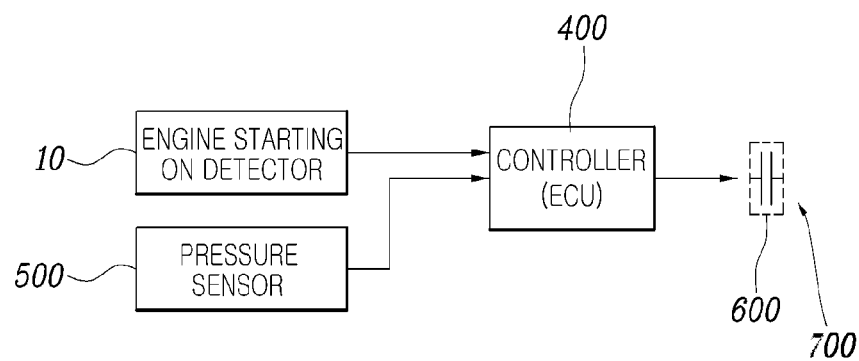
FIG. 2 is a configuration diagram of a controller and sensors indicating vehicle driving information.

FIG. 2 is a configuration diagram between the controller 400 and sensors configured to transmit vehicle driving information to the controller 400. As illustrated in FIG. 2, the 'ECU' which is the controller 400 receives various sensing values measured by an engine starting on detector 10 and the pressure sensor 500, and turns on/off the clutch 600 depending on the sensing values.

The engine starting on detector 10 is installed at the engine side, a start key, or a start button side to sense whether the vehicle which is currently starting is at an early stage of starting and transmit a sensed result to the controller 400.

As described above, the pressure sensor 500 is installed at the vacuum line 30 side to measure the pressure of vacuum introduced into the brake booster 300.

A control process of the engine starting on detector 10, the controller 400, and the clutch 600 will be described below.

The related art has a difficulty in increasing the catalyst temperature at an early stage of starting a vehicle when the turbo system is equipped. To solve the above problem, the related art delays the ignition timing but also increases the open value of the throttle, such that the atmospheric pressure is formed rather than the vacuum pressure in the intake line of the engine, thereby causing the problem of the braking force of the brake at an early stage of starting a vehicle.

According to the exemplary embodiment of the present inventive concept, as described above, if it is determined by the engine starting on detector 10 that the vehicle is at an early stage of starting, the controller 400 transmits a connection control signal to the clutch 600 installed between the driving source 100 and the vacuum pump 200 to introduce a pressure of vacuum which is almost equal to the vacuum pressure into the brake booster 300, thereby maintaining the braking force of the brake at a desired degree at the early stage of starting.

Generally, the vacuum pump rotating shaft 200a of the vacuum pump 200 is connected to the cam shaft 5 installed at the engine side, and thus, the power of the engine is delivered to the vacuum pump rotating shaft 200a via the cam shaft 5. As a result, the clutch 600 according to the exemplary embodiment of the present inventive concept may also be installed between the cam shaft 5 formed at the engine side and the vacuum pump rotating shaft 200a but is not necessarily installed thereat, and therefore may be installed at any position at which it may selectively interrupt the power of the engine side. Thus, the clutch 600 may be installed between a cam shaft 5 installed at the engine side and the vacuum pump rotating shaft 200a to selectively interrupt the power of the engine.

Figure 3:
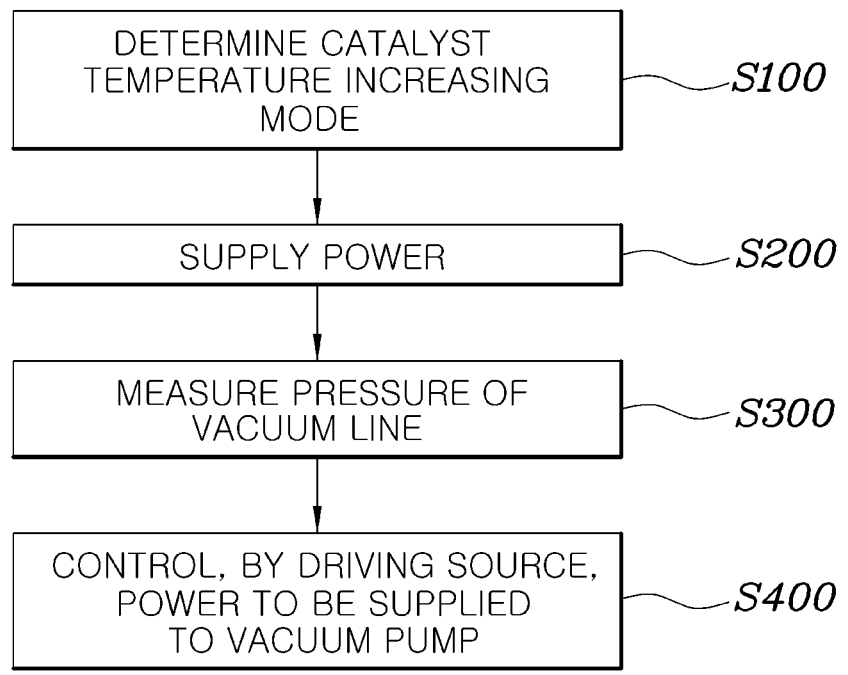
FIG. 3 is an overall flow chart of a method for controlling a vacuum pump in a gasoline vehicle with a clutch according to an exemplary embodiment of the present inventive concept.
Figure 4:
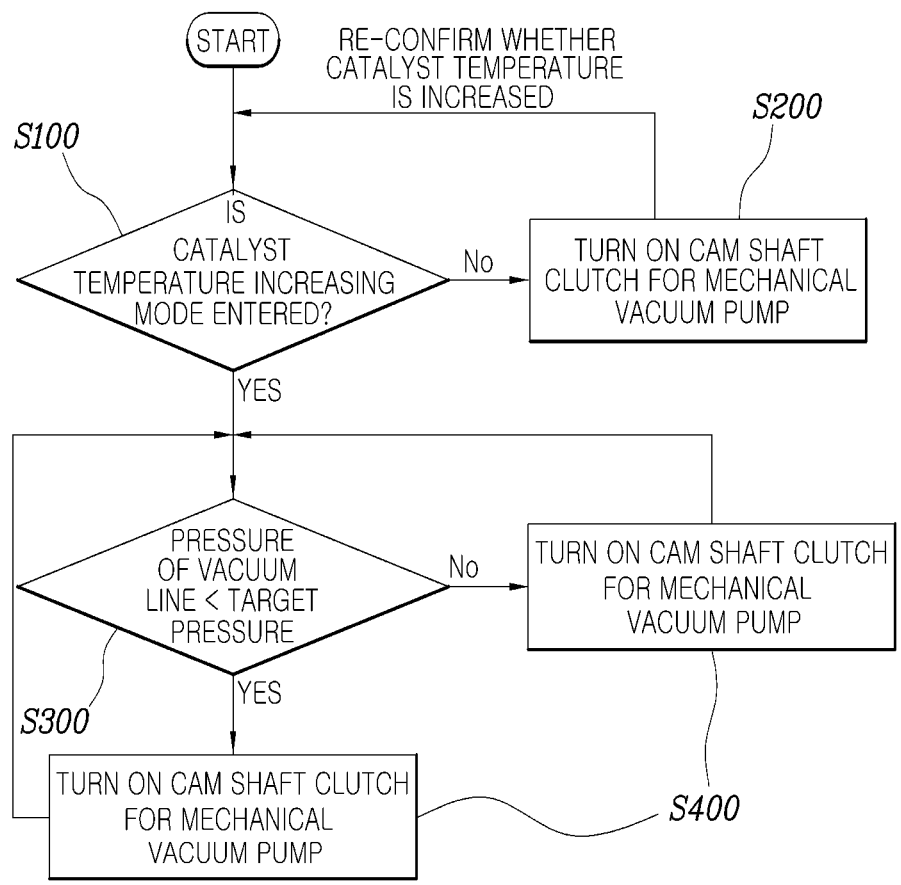
FIG. 4 is a detailed flow chart of each step of the method for controlling a vacuum pump in a gasoline vehicle with a clutch according to the exemplary embodiment of the present inventive concept.

FIG. 3 is an overall flow chart of a method for controlling a vacuum pump in a gasoline vehicle with a clutch 600 according to an exemplary embodiment of the present inventive concept, and FIG. 4 is a detailed flow chart of each step thereof.

As illustrated, according to the exemplary embodiment of the present inventive concept, the method for controlling a vacuum pump in a gasoline vehicle with a clutch includes determining whether a mode is a catalyst temperature increasing mode for increasing a catalyst temperature in consideration of a driving state of a vehicle (S100). Power is supplied to the vacuum pump in the catalyst temperature increasing mode by the driving source (S200). A pressure of vacuum supplied to the vacuum pump is measured (S300). The power is supplied to the vacuum pump by the driving source when the pressure of vacuum supplied to the vacuum pump is higher than a set target pressure value (S400).

In this case, the catalyst temperature increasing mode is operated at the early stage of starting the vehicle, and when the driving state of the vehicle is required to activate a catalyst by increasing the catalyst temperature, the braking force of the brake is maintained at a required temperature even in a temperature increasing mode for increasing the catalyst temperature by allowing a power connector 700 installed between the driving source 100 and the vacuum pump 200 to introduce the power of the driving source 100 into the vacuum pump 200.

The power connector 700 is the clutch 600 which may selectively interrupt power as described above, and the clutch 600 may also be installed between a cam shaft 5 and the vacuum pump rotating shaft 200a installed at the vacuum pump 200.

Further, in the step of measuring the pressure of vacuum (S300), when the pressure of vacuum supplied to the vacuum pump 200 is higher than the target pressure value, a connection signal is transmitted to the clutch 600 and when the pressure of the vacuum line 30 is lower than the target pressure value, an interruption signal is transmitted to the clutch 600.

The detailed operation process thereof has been already described, and therefore, it will be omitted herein.

According to the system and the method for controlling a vacuum pump in a gasoline vehicle with a clutch according to the exemplary embodiments of the present inventive concept as described above, it is possible to increase the braking force of the brake by keeping the pressure inside the brake booster in the vacuum state even in the driving mode for increasing the catalyst temperature, thereby providing stability and reliability of driving as well as various effects such as more increasing the fuel efficiency and more reducing the catalyst cost, as compared with the related art using only a mechanical vacuum pump and the brake booster.

Although the present inventive concept has been shown and described with respect to the exemplary embodiments, it will be obvious to those skilled in the art that the present disclosure may be variously modified and altered without departing from the spirit and scope of the present disclosure as defined by the following claims.

What is claimed is:

1. A method for controlling a vacuum pump in a gasoline vehicle with a clutch, the method comprising steps of:
   determining, by a controller, whether a mode is a catalyst temperature increasing mode for increasing a catalyst temperature in consideration of a driving state of the vehicle;
   supplying, by a driving source, a power to the vacuum pump in the catalyst temperature increasing mode, the driving source supplying the power of an engine;
   measuring, by a pressure sensor, a vacuum pressure supplied to the vacuum pump; and
   controlling, by the driving source, the power to be supplied to the vacuum pump when the vacuum pressure supplied to the vacuum pump is higher than a target pressure value.

2. The method of claim 1, wherein in the step of supplying the power, a connection signal is applied to a power connector installed between the driving source and the vacuum pump.

3. The method of claim 2, wherein the power connector is the clutch which selectively interrupts the power supplied from the engine to the vacuum pump.

4. The method of claim 3, wherein in the step of measuring the vacuum pressure, when the vacuum pressure supplied to the vacuum pump is higher than the target pressure value, the connection signal is transmitted to the clutch and when a pressure of a vacuum line is lower than the target pressure value, an interruption signal is transmitted to the clutch.

5. The method of claim 1, wherein the controller is an electronic control unit (ECU) which compares the target pressure value with the pressure value measured by the pressure sensor and then selectively controls a turn on/off of the clutch according to a comparison result.

6. A system for controlling the vacuum pump in the gasoline vehicle with the clutch according to the method of claim 1, wherein:
   the clutch is installed between the driving source and the vacuum pump to selectively interrupt the power which is supplied from the driving source of the engine to the vacuum pump;
   the pressure sensor is configured to sense a pressure of a vacuum line installed between the vacuum pump and a brake booster; and
   the controller is configured to compare the pressure measured by the pressure sensor with the target pressure value to selectively interrupt the clutch.

7. The system of claim 6, wherein the controller transmits a connection signal to the clutch to maintain the pressure inside the brake booster in a vacuum state at a stage of starting the vehicle to transmit the power from the driving source to a vacuum pump rotating shaft installed at the vacuum pump.

8. The system of claim 6, wherein the controller transmits a connection signal to the clutch when the pressure of the vacuum line is higher than the target pressure value and transmits an interruption signal to the clutch when the pressure of the vacuum line is lower than the target pressure value.

9. The system of claim 6, wherein the clutch is installed between a cam shaft installed in the engine and a vacuum pump rotating shaft installed at the vacuum pump.

10. The system of claim 6, wherein the pressure sensor measures the pressure in real time when the pressure flows from the vacuum pump into the brake booster and transmits a sensed pressure value to the controller.

11. The system of claim 6, wherein the controller selectively controls a turn on/off of the clutch according to a comparison result.

* * * * *